Patented Oct. 31, 1944

2,361,618

UNITED STATES PATENT OFFICE 2,361,618

AZO DYESTUFFS

Friedrich Felix and Alphonse Heckendorn, Basel, Switzerland, assignors to Society of Chemical Industry in Basle, Basel, Switzerland, a Swiss company No Drawing. Application May 19, 1942, Serial No. 443,624. In Switzerland May 29, 1941

8 Claims. (Cl. 260—205)

In French Patent No. 840,512 or British Patent No. 517,918 dyestuffs are described which correspond to the general formula

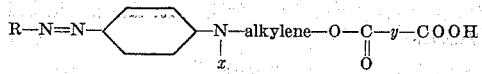

R represents the radical of a diazotizable amine, $x$ is hydrogen or alkyl (this expression also includes substituted alkyl, for example, alkyl substituted by an OH— group, as well as higher alkyl), $y$ is alkylene or alkylidene. It is described therein how these dyestuffs can be obtained by allowing polybasic, especially dibasic, carboxylic acids to react on aminoazo dyestuffs containing an alkyl group which is united to a N-atom and which is substituted by at least one hydroxyl group in such a manner that the OH— group is esterified and that an acid group capable of salt formation is present. Such dyestuffs can also be produced by treating amines of the general formula

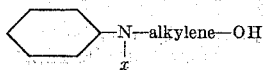

(in which $x$ represents hydrogen or alkyl in the above wide sense of the term) which are capable of coupling, with polybasic carboxylic acids in such a manner that acid esters are produced and hereupon allowing any desired diazo compounds to act on these.

It has now been found that the new dyestuffs which are obtained by introduction of the radical of chlorsulphoacetic acid into the dyestuffs of the general formula

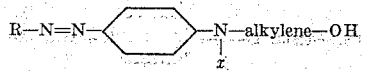

in which R represents the radical of a diazotizable amine, $x$ represents hydrogen or alkyl, including higher alkyl, or substituted alkyl such as alkyl substituted by an OH— group, also possess very valuable properties, since their alkali salts among which their ammonium salts are also to be understood) are remarkable for their very good solubility in water and for an excellent affinity for acetate rayon.

The new dyestuffs can be prepared, for example, by allowing sulphochloracetic acid to act on azo dyestuffs of the general formula

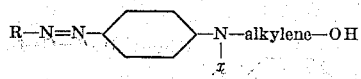

R and $x$ having the meaning given in the preceding paragraph), preferably in the presence of an organic solvent.

It is also possible to allow sulphochloracetic acid to act upon amines of the general formula

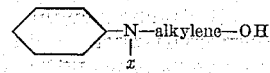

(in which $x$ has the meaning indicated in the preceding paragraph) which are capable of coupling, and then allowing diazo compounds to act upon the resulting condensation products, which are obviously esters.

The new dyestuffs contain chlorsulphoacetic acid probably in the form of an ester, and should therefore correspond in the free state to the general formula

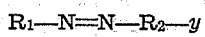

wherein $R_1$ stands for an aromatic nucleus of the benzene series, $R_2$ stands also for an aromatic nucleus of the benzene series in which the —N=N— group and $y$ stand in para-position to each other, and wherein $y$ stands for an amino group substituted at least by a group

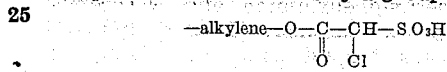

In the course of experiment it has been found that more than the calculated quantity of chlorsulphoacetic acid can be used to advantage in esterifying one hydroxyl group. In the case of intermediate products or dyestuffs which contain more than one hydroxyl group, by suitable choice of the quantity of chlorsulphoacetic acid used, products can be prepared in which all the hydroxyl groups are esterified or which still contain free hydroxyl groups, where it is possible to influence the affinity for the fibre in any desired manner.

These dyestuffs form salts, and especially the alkali salts (among which the salts of ammonia are also to be understood) are readily soluble in water. They can be used for the dyeing of acetyl cellulose, especially acetate rayon; further, in certain cases, they can also be used to dye animal fibres, such as wool or silk. They dye these materials—acetyl cellulose or animal fibres—in yellow, red, brown and blue shades, according to the nature of the non-esterified dyestuffs from which they are derived. The non-esterified dyestuffs which form the basis of the new dyestuffs are formed from the diazotizing and coupling components which are listed below.

If it be desired to prepare the new dyestuffs from coupling components which have already been treated with chlorsulphoacetic acid, the latter are obtained, as already stated, by allowing chlorsulphoacetic acid to react upon coupling amines of the general formula

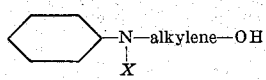

The reaction takes place most satisfactorily if those compounds are heated with chlorsulphoacetic acid, either direct or in organic solvents.

This reaction can be carried out on the following bases, among others:

N-(dihydroxyethyl)-phenylamine, N-(methyl-hydroxyethyl)-phenylamine, N-(ethyl-hydroxyethyl)-phenylamine, N-(methyl-hydroxy-ethyl-hydroxyethyl)-phenylamine, N-(propyl-hydroxyethyl)-phenylamine, N-(methyl-hydroxypropyl)-phenylamine, N-(hydroxypropyl-hydroxyethyl)-phenylamine, N-(isopropyl-hydroxyethyl)-phenylamine, N-(butyl-hydroxyethyl)-phenylamine, N-(isobutyl-hydroxyethyl)-phenylamine, N-(amyl-hydroxyethyl)-phenylamine, N-(ethyl-β-hydroxy-γ-chlorpropyl)-phenylamine, N-(cetyl-hydroxyethyl)-phenylamine and so on. The benzene nucleus can be substituted as desired by methyl groups, alkoxy groups, etc., provided that the para position to the substituted amino group still contains a hydrogen atom which may be exchanged for a diazo radical. Thus, suitable N-substitution products of 3-methyl-phenylamine, 5-methyl-2-methoxy-phenylamine and the like also come into question, such as N-(propyl-hydroxyethyl) 3-methylphenylamine, N-(butyl-hydroxyethyl)-3-methylphenylamine. Further, also, suitable N-substitution products of 3-acidyl-aminophenylamine, for example 3-acetylamino-6-methoxy-1-N-(ethyl-hydroxethyl)-phenylamine, N-(butyl-hydroxyethyl)-2-methoxy-5-acetylaminophenylamine. The use of reaction products derived from N-(butyl-hydroxyethyl)-2-methoxy-5-methylphenylamine and N-(propyl-hydroxyethyl)-2-methoxy-5-methylphenylamine also leads to dyestuffs of good affinity for the fibre.

These intermediate products form compounds which are readily soluble in water; they also dissolve readily in dilute mineral acids and also in water, in the form of their alkali metal and alkaline earth salts.

If these compounds suitable for use as coupling components be reacted in neutral or weakly acid medium with diazo compounds, dyestuffs are obtained which—especially in the form of their alkali metal salts (among which ammonium salts are also to be understood)—are soluble in water. As bases, the diazo compounds of which may be used in the present process, all the aromatic amines in common use are suitable, especially those which contain a nitro group in the para position, such as 4-nitroaminobenzene, 4-nitro-2-chloraminobenzene, 4-nitro-2-methoxyaminobenzene, 4-nitro-2-methylsulphonaminobenzene, 4-nitro-2-cyanaminobenzene, 2:6-dichloro-4-nitroaminobenzene; also 2:4-dinitroaminobenzene, 2:4-dinitro-6-cyanaminobenzene, 2:4-dinitrohalogenaminobenzenes, 2:4-dinitro-6-methylsulphonaminobenzene, 4-nitro-2-cyano-6-halogenaminobenzene. It is, however, also possible to start from bases which contain sulphonic acid groups, for example, 4-nitroaminobenzene-2-sulphonic acid, etc. Furthermore, aniline, toluidines, anisidines and also 2-nitroamino-benzenes and 3-nitroaminobenzenes can be used.

The following examples explain the invention without in any way restricting it, the parts being by weight:

*Example 1*

165 parts of N-(ethyl-hydroxyethyl)-phenylamine are dissolved in 1000 parts by volume of toluene; 260 parts of sulphochloracetic acid are added, and the reaction mixture is boiled for 1 hour with stirring. The water of esterification which evaporates with the toluene is trapped, so that the excess of toluene is constantly returned to the reaction flask. When the reaction is completed, the toluene is removed by distillation, and the residue is dissolved in 2000 parts of water. The aqueous solution, filtered if necessary, is now coupled in the usual manner with the diazo solution obtained from 138 parts of 4-nitroaminobenzene, and the mineral acid is neutralised with sodium acetate. The dyestuff is filtered at the pump, again pasted up with water, made exactly neutral with ammonia, again filtered, and dried in vacuo.

A scarlet-red powder which in free form has the probable formula

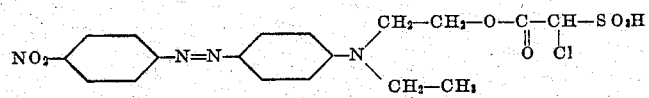

is obtained in a yield of 80–90%. The ammonium salt thus obtained dissolves very readily in water and dyes acetate rayon in scarlet-red tones from a neutral Glauber's salt dyebath.

The dyestuff having in the free form the formula

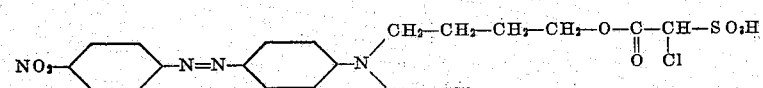

possesses similar properties. The same applies also to the dyestuff of the formula

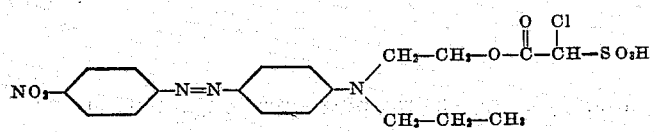

4-nitro-2-chloraminobenzene or 4-nitro-2-cyanaminobenzene can be used as diazo components in a similar manner, red and reddish violet dyestuffs being obtained respectively. If 2-nitroaminobenzene be used, an orange dyestuff is obtained, whilst aniline or chloraniline yields a yellow dyestuff.

*Example 2*

226 parts of sulphochloracetic acid are added to a solution of 195 parts of N-(dihydroxyethyl)-3-methyl-phenylamine in 1000 parts by volume of toluene, and the reaction mixture is boiled for 1 hour with stirring. When the reaction is complete, 4000 parts of water are added, when complete solution is obtained.

The solution is separated from the toluene and is coupled, in the presence of ice, by running in the sulphuric acid diazo solution obtained from 163 parts of 4-nitro-2-cyano-1-aminobenzene. It is then neutralized by dropping in 2600 parts of caustic soda solution of 30% strength, and the dyestuff is filtered off at the pump, washed until salt-free and dried in vacuo.

250 parts of a dark-coloured powder are obtained. This product represents the sodium salt of a dyestuff which in the free form consists chiefly of the compound

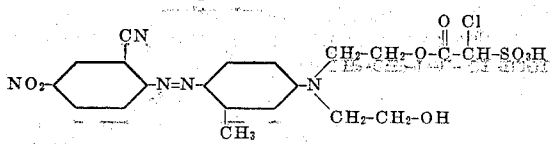

This powder dissolves readily in water and dyes acetate rayon in full violet tones from a neutral Glauber's salt dyebath.

When working as described above, but with the only difference that 370 parts of the sulfochloracetic acid are used, there is obtained a dyestuff which represents the sodium salt of a product and which in the free form corresponds to the formula

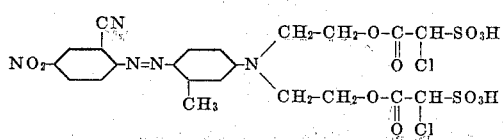

This dyestuff is distinguished from the dyestuff which contains only one

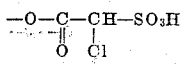

group merely by its increased solubility in water.

Blue-violet dyestuffs are obtained by using 4-nitro-2-cyano-6-chloro-1-aminobenzene as diazo compound and the mono- or the di-sulphochloracetic acid ester of the dihydroxyethyl-meta-toluidine as coupling component.

Speaking quite generally, all the aromatic—aliphatic hydroxyamines mentioned in the specification can be converted into esters of chlorsulphoacetic acid by the methods of working detailed in these two examples, and these esters may be combined with all the diazo compounds derived from the diazotizing components listed in the specification to yield water-soluble dyestuffs.

*Example 3*

195 parts of N-(dihydroxyethyl)-3-methyl-phenylamine are dissolved in 1000 parts by volume of toluene; 226 parts of sulphochloracetic acid are added, and the reaction mixture is boiled for 1 hour with stirring. The toluene is then removed by distillation under reduced pressure; the residue is dissolved in 4000 parts by volume of methanol and, if necessary, filtered. This solution is now coupled with a diazo solution obtained from 4:6-dinitro-2-cyananiline by running in the diazo solution whilst cooling the solution (externally) to —10° C. The diazo solution is prepared by diazotizing 208 parts of 4:6-dinitro-2-cyan-1-aminobenzene at 30° C. in the solution—prepared in the usual way—obtained from 69 parts of sodium nitrite and 1000 parts of concentrated sulphuric acid. When coupling is complete, the methyl alcoholic suspension of dyestuff is stirred into a mixture of 4000 parts of ice and 4000 parts of water, the dyestuff is filtered at the pump, stirred into a suspension with water, neutralised with ammonia, again filtered with suction, and dried at low temperature in vacuo.

The dyestuff, which has in the free state the probable formula

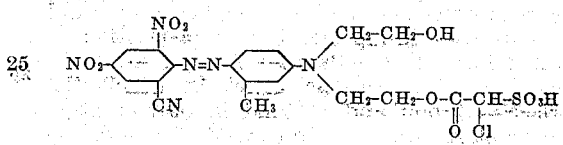

is an ammonium salt which dissolves in warm water with a blue colour and dyes acetate rayon in bright blue shades from a neutral bath containing sodium sulphate.

If larger quantities of sulphochloracetic acid are used, for example, about 370 parts, both hydroxyl groups of the dihydroxyethyl-meta-toluidine can be completely esterified. There is obtained a dyestuff which in the free form corresponds to the formula

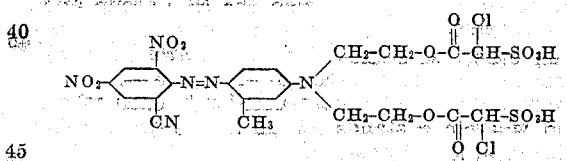

A redder dyestuff is formed if mono-hydroxyethyl-meta-toluidine be esterified in place of the dihydroxyethyl compound with sulphochloracetic acid and hereupon coupled with the diazo compound of this example.

*Example 4*

314 parts of the insoluble azo dyestuff obtained by coupling N-(ethyl-hydroxyethyl)-phenylamine with diazotized paranitraniline are dissolved in 1000 parts of toluene and are heated to the boil for 1 hour in the presence of 260 parts of sulphochloracetic acid whilst stirring. The water of esterification which distils with the toluene is trapped, whilst the excess toluene is returned to the reaction vessel. When the reaction is complete, the toluene is distilled and the residual dyestuff is neutralised with ammonia in the presence of a little water. A scarlet-red powder possessing properties identical with those of the deystuff obtained in Example 1 is obtained.

*Example 5*

0.5 part of the dyestuff obtained in Example 1 is dissolved in 3000 parts of water. 40 parts of crystalline sodium sulphate are then added to the dyebath, in which 100 parts of acetate rayon yarn are then worked for 1 hour at 80° C. After rinsing and drying, an acetate rayon is obtained which is dyed a pure scarlet-red shade.

The acetate rayon can be dyed in various shades, according to the nature of the dyestuff selected.

What we claim is:

1. The dyestuffs of the general formula $$R_1-N=N-R_2-y$$

wherein $R_1$ stands for an aromatic nucleus of the benzene series, $R_2$ stands also for an aromatic nucleus of the benzene series in which the —N=N— group and $y$ stand in para-position to each other, and wherein $y$ stands for an amino group substituted at least by a group

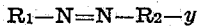

wherein the alkylene group contains a maximum of 4 carbon atoms.

2. The dyestuffs of the general formula $$NO_2-R_1-N=N-R_2-y$$

wherein $R_1$ stands for an aromatic nucleus of the benzene series in which the $NO_2$ group and the —N=N— group stand in para-position to each other, $R_2$ stands also for an aromatic nucleus of the benzene series in which the —N=N— group and $y$ stand in para-position to each other, and wherein $y$ stands for an amino group substituted at least by a group

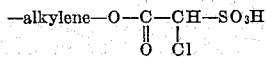

wherein the alkylene group contains a maximum of 4 carbon atoms.

3. The dyestuffs of the general formula $$NO_2-R_1-N=N-R_2-y$$

wherein $R_1$ stands for an aromatic nucleus of the benzene series in which the $NO_2$ group and the —N=N— group stand in para-position to each other, $R_2$ stands also for an aromatic nucleus of the benzene series in which the —N=N— group and $y$ stand in para-position to each other, and wherein $y$ stands for an amino group substituted at least by a group

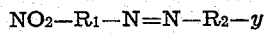

4. The dyestuffs which correspond in the free form to the general formula

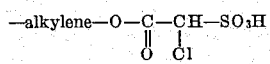

wherein $R_1$ stands for an aromatic nucleus of the benzene series in which the $NO_2$ group and the —N=N— group stand in para-position to each other, $R_2$ stands also for an aromatic nucleus of the benzene series in which the —N=N— group and

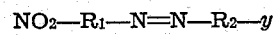

stand in para-position to each other and $x$ stands for a member of the group consisting of hydrogen, alkyl, hydroxy alkyl and

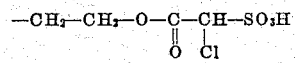

5. The dyestuffs which correspond in the free form to the general formula

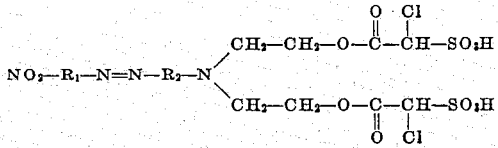

wherein $R_1$ stands for an aromatic nucleus of the benzene series in which the $NO_2$ group and the —N=N— group stand in para-position to each other, $R_2$ stands also for an aromatic nucleus of the benzene series in which the —N=N— group and

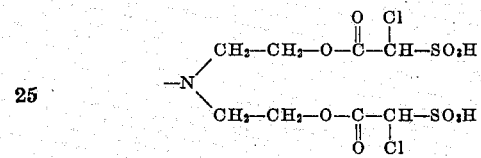

stand in para-position to each other.

6. The dyestuffs which correspond in the free form to the general formula

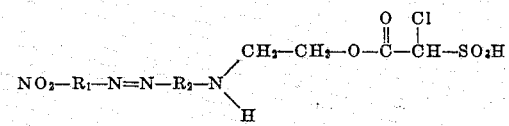

wherein $R_1$ stands for an aromatic nucleus of the benzene series in which the $NO_2$ group and the —N=N— group stand in para-position to each other, $R_2$ stands also for an aromatic nucleus of the benzene series in which the —N=N— group and

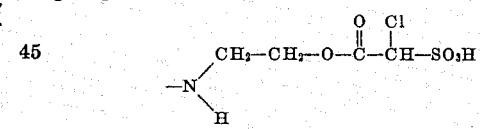

stand in para-position to each other.

7. The dyestuff of the formula

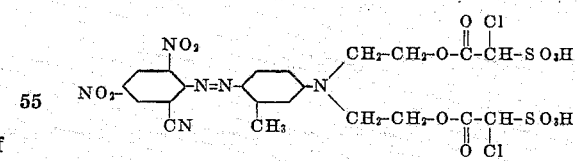

8. The dyestuff of the formula

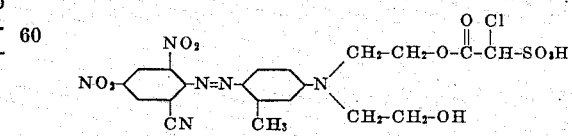

FRIEDRICH FELIX.
ALPHONSE HECKENDORN.